(12) United States Patent
Koo et al.

(10) Patent No.: US 7,804,734 B2
(45) Date of Patent: Sep. 28, 2010

(54) DATA STROBE BUFFER AND MEMORY SYSTEM INCLUDING THE SAME

(75) Inventors: Kyung-Hoi Koo, Suwon-si (KR); Jin-Ho Seo, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 225 days.

(21) Appl. No.: 12/193,952

(22) Filed: Aug. 19, 2008

(65) Prior Publication Data

US 2009/0052261 A1    Feb. 26, 2009

(30) Foreign Application Priority Data

Aug. 24, 2007   (KR)  ................. 10-2007-0085690

(51) Int. Cl.
*G11C 8/00*   (2006.01)
(52) U.S. Cl. .................. 365/230.06; 365/193
(58) Field of Classification Search ............ 365/230.06, 365/193
See application file for complete search history.

(56) References Cited

U.S. PATENT DOCUMENTS

2004/0196725 A1*  10/2004  Kang ................ 365/230.08

FOREIGN PATENT DOCUMENTS

| JP | 2002007200 A | 1/2002 |
|---|---|---|
| JP | 2005353168 A | 12/2005 |
| JP | 2006059046 A | 3/2006 |

* cited by examiner

*Primary Examiner*—Huan Hoang
*Assistant Examiner*—Jason Lappas
(74) *Attorney, Agent, or Firm*—Volentine & Whitt, PLLC

(57) ABSTRACT

A data strobe buffer and a memory system including the data strobe buffer are provided. The data strobe buffer includes: a first input/output node; a first driver coupled to the first input/output node, the first driver configured to output a first data strobe signal to the first input/output node during a write operation; and a first receiver coupled to receive a second data strobe signal from the first input/output node and output a third data strobe signal during a read operation when the data strobe buffer is in a first or second mode, the first receiver configured to compare the second data strobe signal with a first reference voltage and output a result of the comparison as the third data strobe signal when the data strobe buffer is in the first mode, the receiver further configured to not compare the second data strobe signal with the first reference voltage when the data strobe buffer is in the second mode.

20 Claims, 12 Drawing Sheets

< 1st MODE >

< 2nd MODE >

< 3rd MODE >

< 4th MODE >

DATA STROBE BUFFER AND MEMORY SYSTEM INCLUDING THE SAME

CROSS-REFERENCE TO RELATED APPLICATION

This application claims priority from Korean Patent Application No. 10-2007-0085690 filed on Aug. 24, 2007 in the Korean Intellectual Property Office, the disclosure of which is incorporated herein by reference in its entirety.

BACKGROUND OF THE INVENTION

1. Field of the Invention

The invention relates generally to semiconductor memory devices, and more particularly, but without limitation, to a data strobe buffer that can be interfaced to different types of semiconductor memory devices, and a memory system including the same.

2. Description of the Related Art

Synchronous Dynamic Random Access Memory (SDRAM) devices, which operate in synchronization with the clock signal of a system, can be classified according to the class of application. For instance, Mobile Double-Data-Rate (MDDR) SDRAM devices are used in mobile devices, Double-Data-Rate (DDR) SDRAM devices are used in various devices other than mobile devices, DDR2 SDRAM and DDR3 SDRAM devices are used in applications that require operating speeds that are faster than DDR SDRAM devices, and graphics DDR (GDDR) SDRAM devices are used in graphics data processing. Each of these semiconductor memory device types has different properties and may thus require different types of memory controllers. For example, DDR SDRAM devices may use a memory controller having a single-ended type data strobe buffer which compares the data strobe signal with the reference voltage, whereas DDR2 SDRAM devices may use a memory controller having a differential type data strobe buffer which compares the data strobe signal with the inverted signal of the data strobe signal.

Therefore, a data strobe buffer which can enable the memory controllers of different types of semiconductor memory devices is needed.

SUMMARY OF THE INVENTION

Embodiments of the invention provide a data strobe buffer which can interface with different types of semiconductor memory devices. Embodiments of the invention also provide a memory system including a data strobe buffer which can interface with different types of semiconductor memory devices.

The invention is not restricted to the embodiments set forth herein. The above and other aspects of the invention will become apparent to one of daily skill in the art to which the invention pertains by referencing the detailed description of the invention below.

According to an embodiment of the invention, there is provided a data strobe buffer including: a first input/output node; a first driver coupled to the first input/output node, the first driver configured to output a first data strobe signal to the first input/output node during a write operation; and a first receiver coupled to receive a second data strobe signal from the first input/output node and output a third data strobe signal during a read operation when the data strobe buffer is in a first or second mode, the first receiver configured to compare the second data strobe signal with a first reference voltage and output a result of the comparison as the third data strobe signal when the data strobe buffer is in the first mode, the receiver further configured to not compare the second data strobe signal with the first reference voltage when the data strobe buffer is in the second mode.

BRIEF DESCRIPTION OF THE DRAWINGS

The above and other aspects and features of the present invention will become apparent by describing in detail exemplary embodiments thereof with reference to the attached drawings, in which.

DESCRIPTION OF EMBODIMENTS

The invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Figure 1:
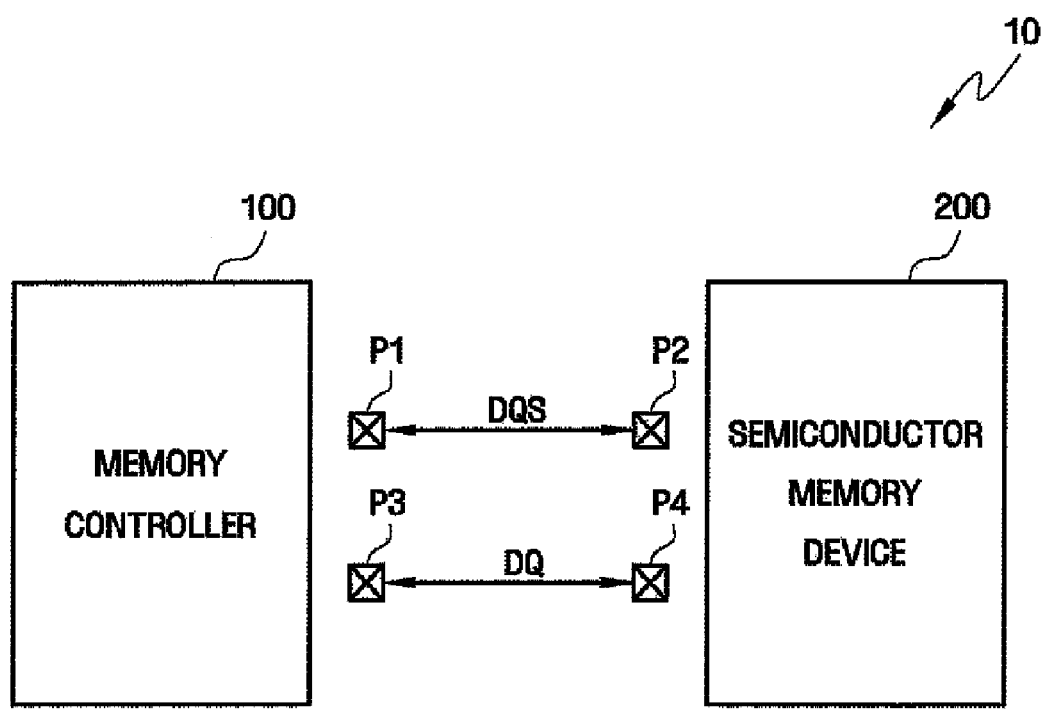
FIG. 1 is a block diagram of a memory system according to an embodiment of the present invention.
Figure 2:
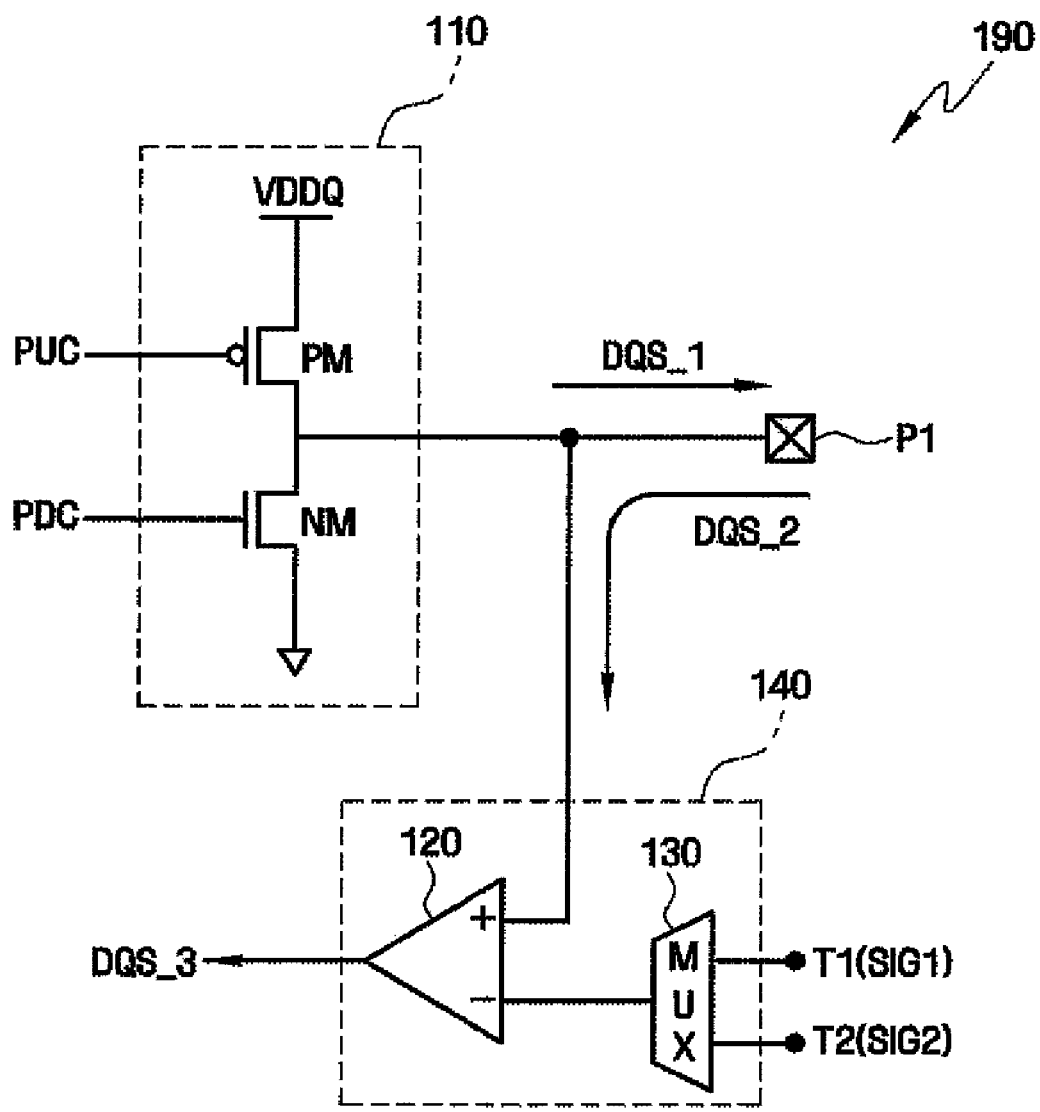
FIG. 2 is a circuit diagram of a data strobe buffer according to an embodiment of the present invention.
Figure 3A:
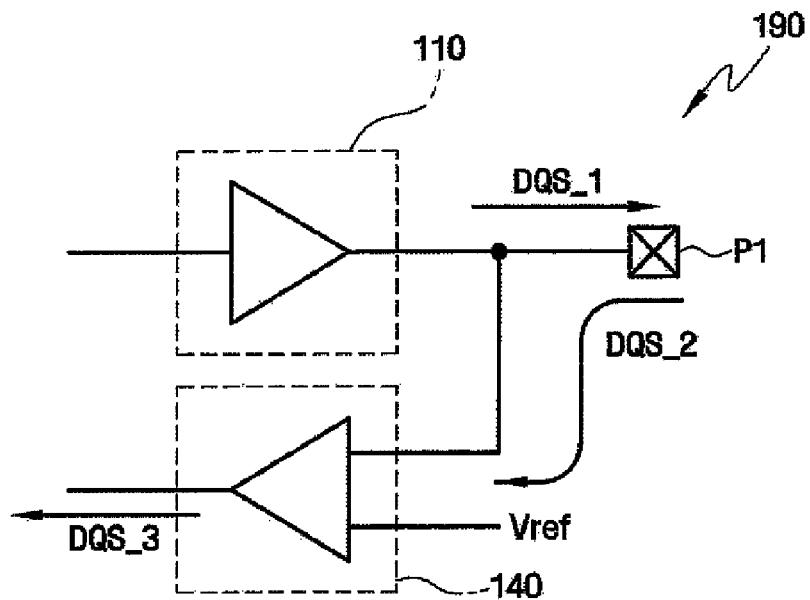
FIG. 3A is an equivalent circuit diagram for explaining an operation of the data strobe buffer illustrated in FIG. 2 in a first mode, according to an embodiment of the present invention.
Figure 3B:
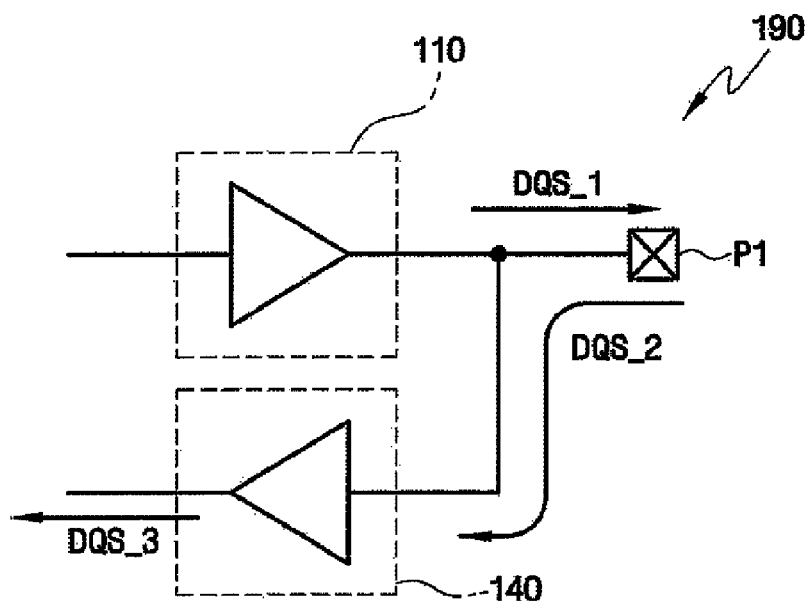
FIG. 3B is an equivalent circuit diagram for explaining an operation of the data strobe buffer illustrated in FIG. 2 in a second mode, according to an embodiment of the present invention.
Figure 4:
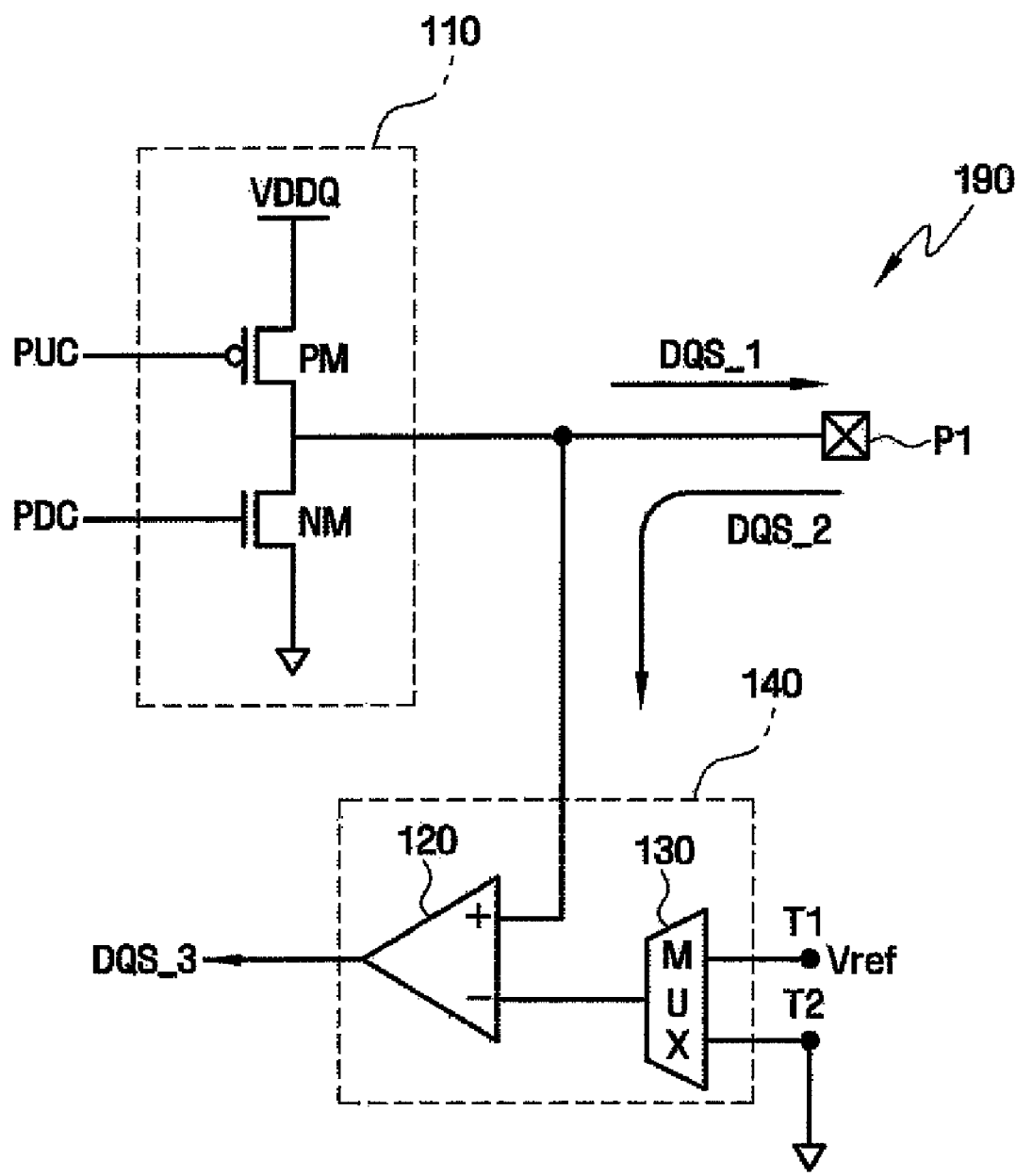
FIG. 4 is an equivalent circuit diagram for further explaining the operation of the data strobe buffer illustrated in FIG. 2 in either the first mode or the second mode, according to another embodiment of the present invention.

A data strobe buffer according to an embodiment of the invention and a memory system including the data strobe buffer, according to an embodiment of the present invention will hereinafter be described in detail with reference to FIGS. 1 through 4. FIG. 1 is a block diagram of a memory system 10 according to an embodiment of the present invention. FIG. 2 is a circuit diagram of a data strobe buffer 190 according to an embodiment of the present invention. FIG. 3A is an equivalent circuit diagram for explaining an operation of the data strobe buffer 190 in a first mode. FIG. 3B is an equivalent circuit diagram for explaining an operation of the data strobe buffer 190 in a second mode. FIG. 4 is an equivalent circuit diagram for further explaining the operation of the data strobe buffer 190 either in the first mode or in the second mode.

Referring to FIG. 1, the memory system 10 includes a memory controller 100 coupled to a semiconductor memory device 200. The memory controller 100 interfaces with the memory device 200 through first through fourth input/output (I/O) pads P1 through P4. For example, to write data DQ to the memory device 200, the memory controller 100 may output a data strobe signal DQS and the data DQ to the memory device 200 via the first I/O pad P1 and the third I/O pad P3, respectively. To read the data DQ from the memory device 200, the memory controller 100 may receive the data strobe signal DQS and the data DQ from the memory device 200 through the first I/O pad P1 and the third I/O pad P3, respectively.

The memory device 200 may be any type of semiconductor memory device. For example, the memory device 200 may be a double-data-rate (DDR) synchronous dynamic random access memory (SDRAM) or a mobile DDR (MDDR) SDRAM. That is, the memory controller 100 can interface with different types of semiconductor memory devices.

The memory controller 100 may include the data strobe buffer 190 illustrated in FIG. 2. Referring to FIG. 2, the data strobe buffer 190 includes a driver 110 and a receiver 140. The data strobe buffer 190 provides a first data strobe signal DQS_1 to the memory device 200 during a write operation, and is provided with a second data strobe signal DQS_2 by the memory device 200 during a read operation. That is, the data strobe buffer 190 outputs the first data strobe signal DQS_1 through the first I/O pad P1 during a write operation and receives the second data strobe signal DQS_2 through the first I/O pad P1 during a read operation.

The driver 110, which outputs the first data strobe signal DQS_1 during a write operation, may include a pull-up transistor PM which operates in response to a pull-up control signal PUC and a pull-down transistor NM which operates in response to a pull-down control signal PDC. The pull-up transistor PM may be a p-channel metal-oxide-semiconductor (PMOS) transistor and the pull-down transistor NM may be an n-channel metal-oxide-semiconductor (NMOS) transistor. The receiver 140, which receives the second data strobe signal DQS_2 during a read operation, may include a comparator 120 and a selector 130. During a read operation, the selector 130 selects one of a first input signal SIG1 input thereto through a first input terminal T1, and a second input signal SIG2 input thereto through a second input terminal T2, and provides the selected signal to the comparator 120. The selector 130 may be or include a multiplexer, and, particularly, an analog multiplexer. The comparator 120 compares the second data strobe signal DQS_2 with whichever of the first input signal SIG1 and the second input signal SIG2 is provided by the selector 130, and provides a third data strobe signal DQS_3 according to the result of the comparison.

The data strobe buffer 190 may operate in different modes according to the type of the memory device 200.

Referring to FIG. 3A, the data strobe buffer 190 outputs the first data strobe signal DQS_1 to the first I/O pad P1 during a write operation in a first mode. During a read operation in the first mode, the data strobe buffer 190 receives the second data strobe signal DQS_2 through the first I/O pad P1, compares the second data strobe signal DQS_2 with a reference voltage Vref, and outputs the third data strobe signal DQS_3 according to the result of the comparison. The first mode may be an operating mode of the data strobe buffer 190 when the data strobe buffer 190 interfaces with DDR SDRAM.

Referring to FIG. 3B, the data strobe buffer 190 outputs the first data strobe signal DQS_1 through the first I/O output pad P1 during a write operation in a second mode, and receives the second data strobe signal DQS_2 through the first I/O pad P1 during a read operation in the second mode. During a read operation in the second mode, the data strobe buffer 190 provides the second data strobe signal DQS_2 as the third data strobe signal DQS_3 without comparing the second data strobe signal DQS_2 with the reference voltage Vref. The second mode may be an operating mode of the data strobe buffer 190 when the data strobe buffer 190 interfaces with an MDDR SDRAM.

An operation of the data strobe buffer 190 in the first mode or in the second mode will hereinafter be described in further detail with reference to FIG. 4.

Referring to FIG. 4, during a write operation in the first mode or in the second mode, the driver 110 outputs the first data strobe signal DQS_1 through the first I/O pad P1. In this case, the receiver 140 may be disabled. The driver 110 may output a first data strobe signal DQS_1 having a high level. For example, if the pull-up control signal PUC has a low level, the pull-up transistor PM is enabled and thus pulls up the first I/O pad P1 to a power supply voltage VDDQ. If the pull-up control signal PUC and the pull-down control signal PDC both have a high level, the pull-up transistor PM is disabled, and the pull-down transistor NM is enabled. Thus, the pull-down transistor NM pulls down the first I/O pad P1 to a ground voltage. Therefore, the driver 110 may output a first data strobe signal DQS_1 having a low level through the first I/O pad P1. If the pull-up control signal PUC has a high level and the pull-down control signal PDC has a low level, the driver 110 may transition to a high impedance state Hi-Z.

During a read operation in the first mode, the receiver 140 receives the second data strobe signal DQS_2 through the first I/O pad P1. The reference voltage Vref may be applied to the first input terminal T1 of the selector 130, and the ground voltage may be applied to the second input terminal T2 of the selector 130. For example, the reference voltage Vref may be half as high as the power supply voltage VDDQ. The selector 130 selects the reference voltage Vref and provides the reference voltage Vref to the comparator 120. The selector 130 may select the reference voltage Vref in response to a mode signal (not shown) indicating that the memory device 200 is DDR SDRAM. The comparator 120 compares the second data strobe signal DQS_2 with the reference voltage Vref provided by the selector 130, and outputs the third data strobe signal DQS_3 according to the result of the comparison.

During a read operation in the second mode, the receiver 140 receives the second data strobe signal DQS_2 through the first I/O pad P1. The reference voltage Vref may be applied to the first input terminal T1 of the selector 130, and the ground voltage may be applied to the second input terminal T2 of the selector 130. In the second mode, the first input terminal T1 may be floated. The selector 130 selects the ground voltage on the second terminal T2 and provides the ground voltage to the comparator 120. The selector 130 may select the ground voltage in response to a mode signal (not shown) indicating that the memory device 200 is an MDDR SDRAM. The comparator 120 compares the second data strobe signal DQS_2 with the ground voltage provided by the selector 130 and outputs the third data strobe signal DQS_3 according to the result of the comparison.

In short, the data strobe buffer 190 may interface with MDDR SDRAM and DDR SDRAM.

Figure 5:
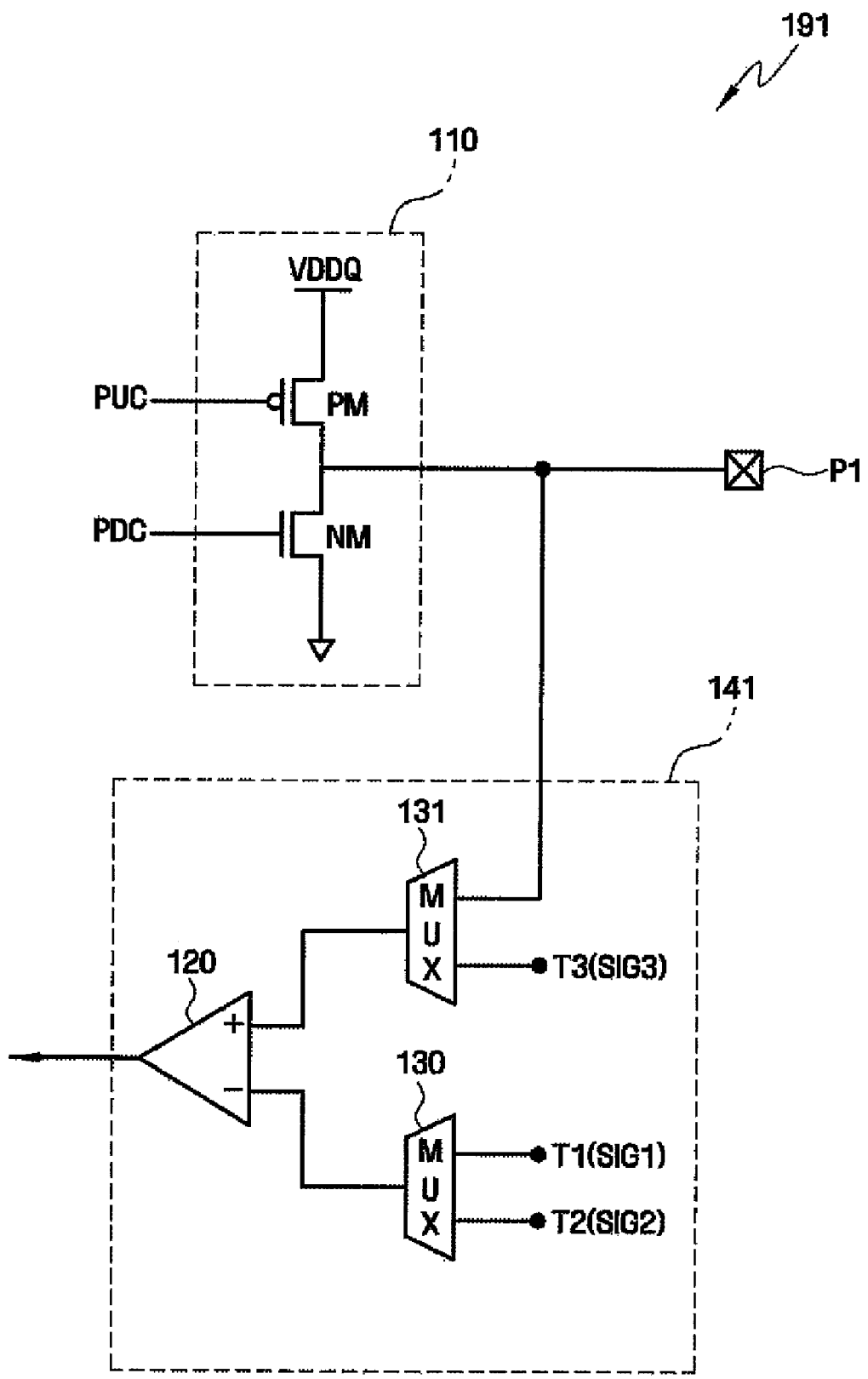
FIG. 5 is a circuit diagram of a data strobe buffer according to another embodiment of the present invention.

A data strobe buffer 191 according to another embodiment of the present invention and a memory system including the data strobe buffer 191, according to another embodiment of the invention will hereinafter be described in detail with reference to FIG. 5. In FIGS. 2 and 5, like reference numerals represent like elements, and, thus, detailed descriptions thereof are not repeated.

Referring to FIG. 5, a data receiver 141 of the data strobe buffer 191 includes two selectors whereas the data receiver 140 of the data strobe buffer 190 includes only one selector. Specifically, the data receiver 141 includes a first selector 130 and a second selector 131. The first selector 130 selects one of a first input signal SIG1 input thereto through a first input terminal T1 and a second input signal SIG2 input thereto through a second input terminal T2 and provides the selected signal to the comparator 120. The second selector 131 selects one of a predetermined signal input thereto through the first I/O pad P1 and a third input signal SIG3 input thereto through a third input terminal T3, and provides the selected signal to the comparator 120.

For example, a second data strobe signal DQS_2 may be input to the data strobe buffer 191 through the first I/O pad P1, a reference voltage Vref may be applied to the first input terminal T1, a ground voltage may be applied to the second input terminal T2, and the reference voltage Vref may also be applied to the third input terminal T3. In this case, the first selector 130 may select the reference voltage Vref and provide the reference voltage Vref to the comparator 120, and the second selector 131 may select the second data strobe signal DQS_2 and provide the second data strobe signal DQS_2 to the comparator 120. Then, the transmission path of the reference voltage Vref to the comparator 120 and the transmission path of the second data strobe signal DQS_2 to the comparator 120 may be symmetrical to each other. That is, the first selector 130 and the second selector 131 may provide the reference voltage Vref and the second data strobe signal DQS_2, respectively, to the comparator 120 at the same time. The first selector 130 and the second selector 131 may select the reference voltage Vref and the second data strobe signal DQS_2, respectively, in response to a mode signal (not shown) indicating the type of the memory device 200.

Figure 6:
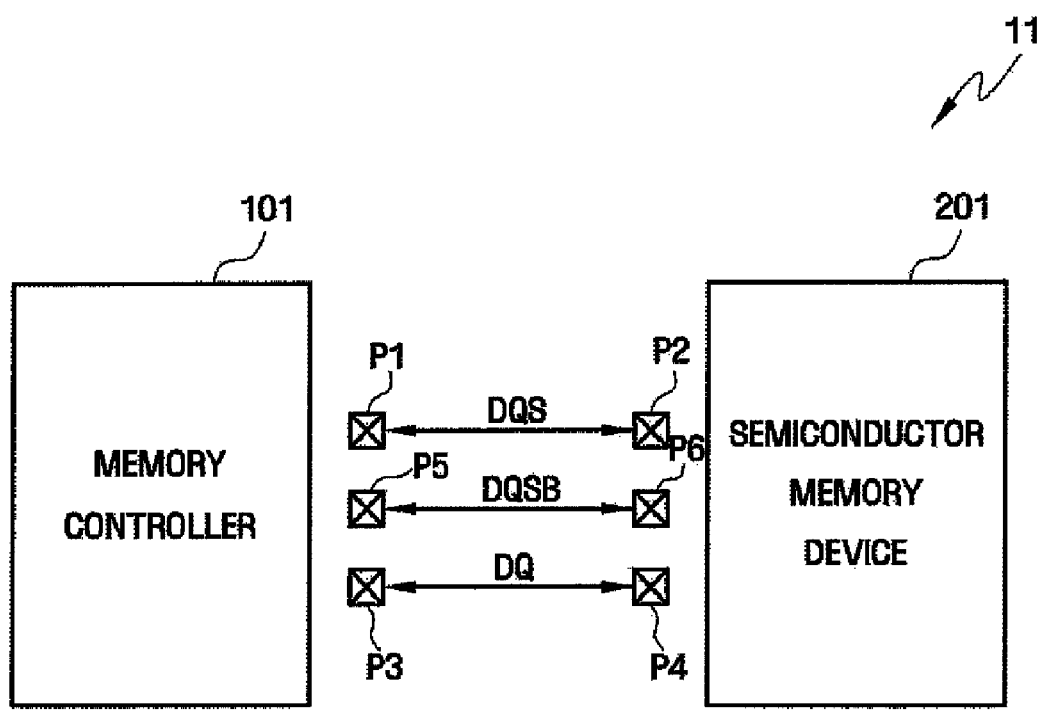
FIG. 6 is a block diagram of a memory system according to another embodiment of the present invention.
Figure 7:
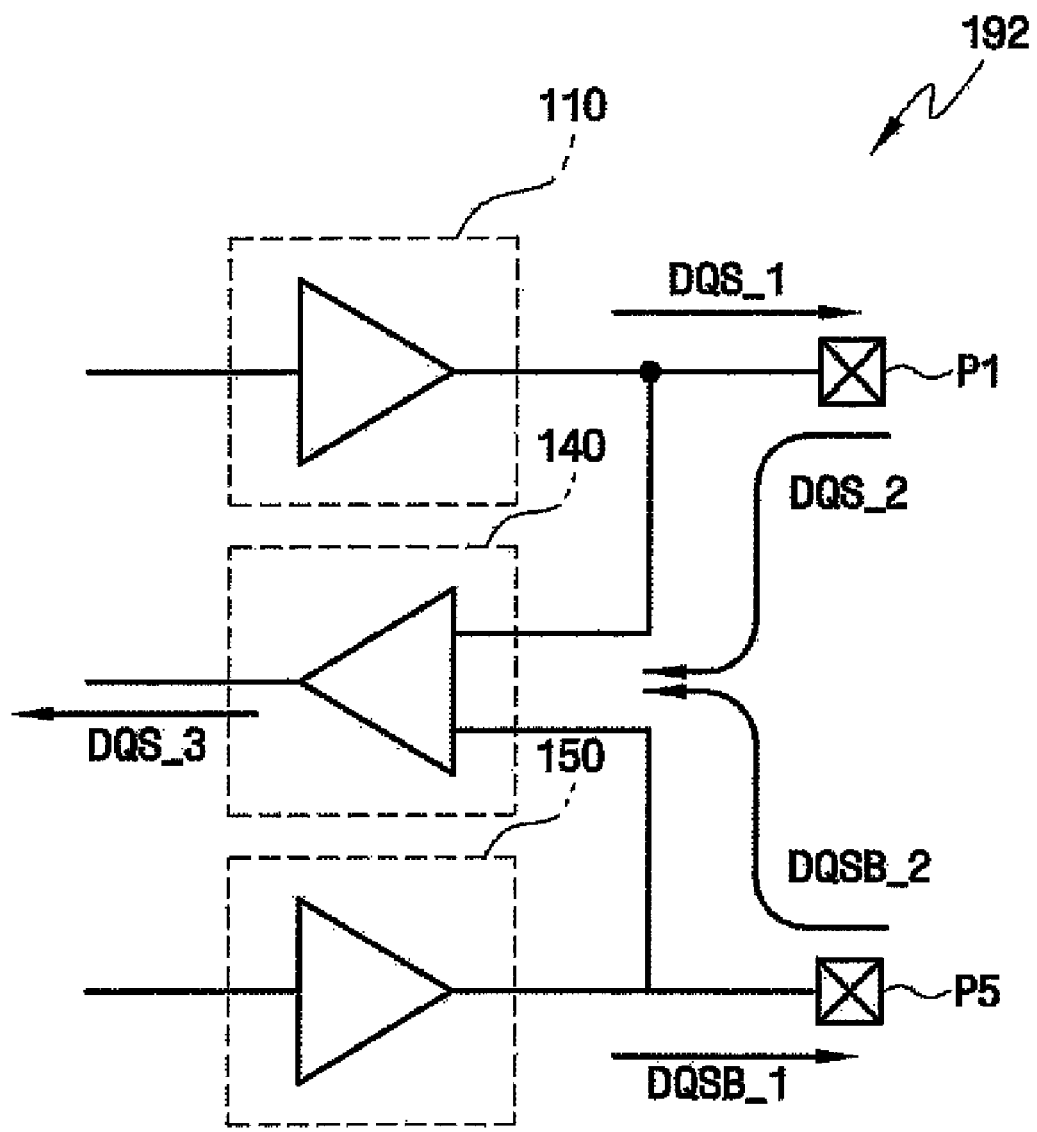
FIG. 7 is a circuit diagram of a data strobe buffer according to another embodiment of the present invention, and explains an operation of the data strobe buffer in a third mode, according to an embodiment of the present invention.
Figure 8A:
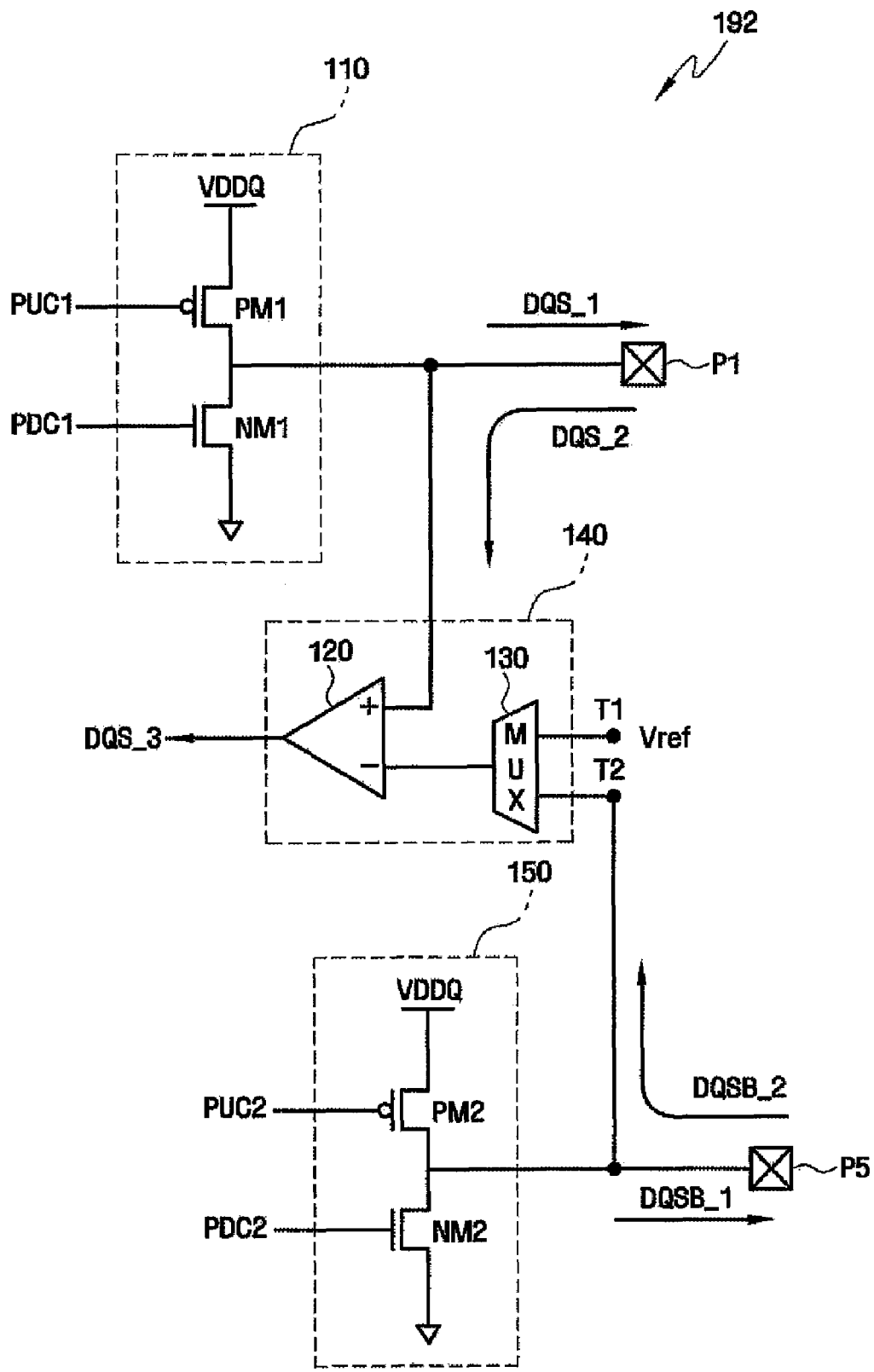
FIGS. 8A and 8B are equivalent circuit diagrams for explaining an operation of the data strobe buffer illustrated in FIG. 7 in the third mode, according to another embodiment of the present invention.
Figure 8B:
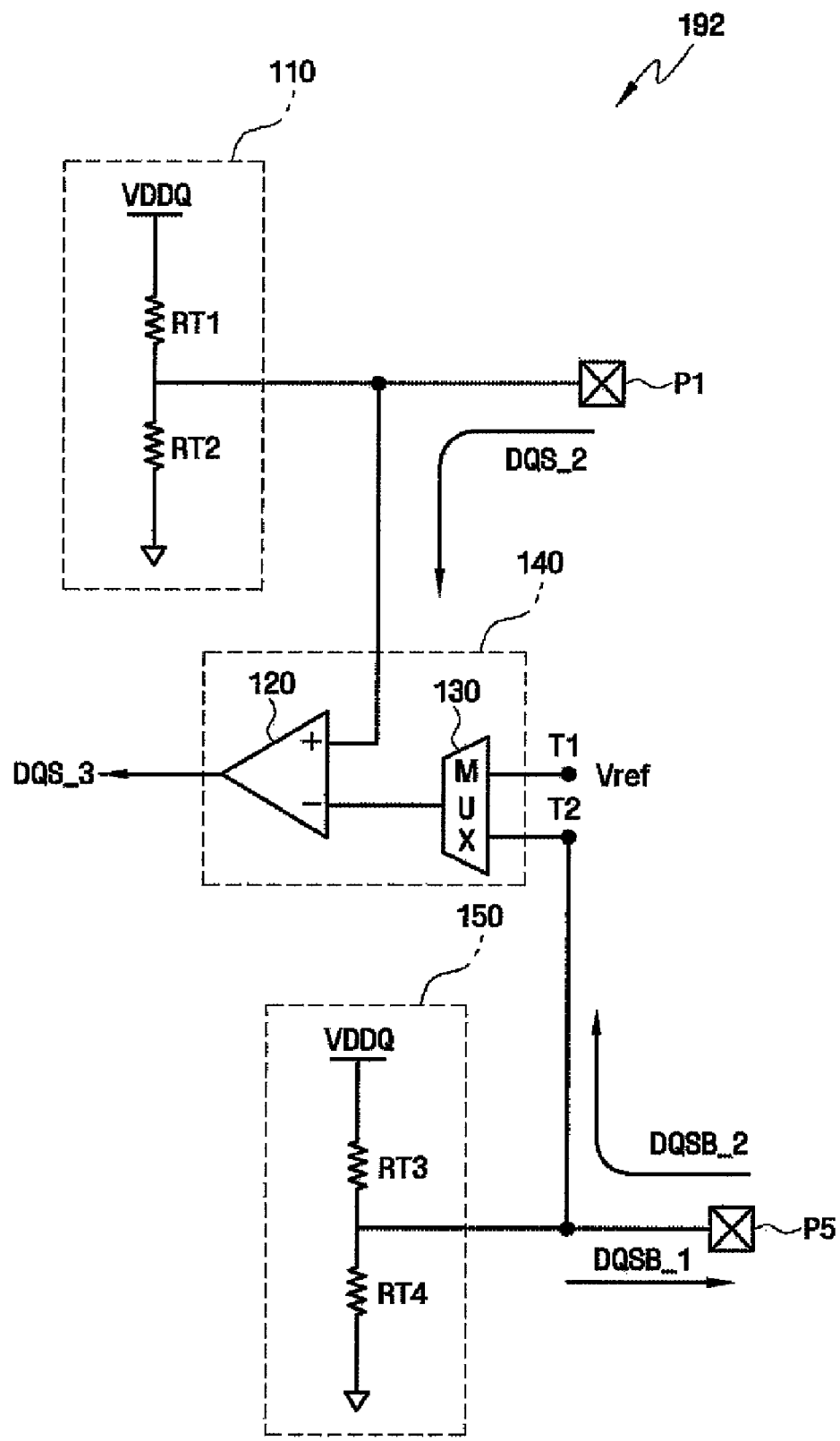

A data strobe buffer 192 according to another embodiment of the invention and a memory system 11 including the data strobe buffer 192, according to another embodiment of the invention will hereinafter be described in detail with reference to FIGS. 6 through 8B. FIG. 6 is a block diagram of the memory system 11, FIG. 7 is a circuit diagram of the data strobe buffer 192, and FIGS. 8A and 8B are equivalent circuit diagrams for explaining an operation of the data strobe buffer 192 in a third mode. In FIGS. 1, 2, and 6 through 8B, like reference numerals represent like elements, and thus detailed descriptions thereof will not be repeated.

Referring to FIG. 6, a memory controller 101 writes data DQ to a memory device 201, and reads data DQ from the memory device 201, using a data strobe signal DQS and a data strobe bar signal DQSB. The data strobe bar signal DQSB is an inverted signal of the data strobe signal DQS. The memory controller 101 transmits and receives the data strobe bar signal DQSB via a fifth I/O pad P5. The memory device 201 may be a DDR2 SDRAM or a DDR3 SDRAM.

Referring to FIG. 7, the data strobe buffer 192, which can be included in the memory controller 101, may operate in the third mode.

Specifically, during a write operation in the third mode, the data strobe buffer 192 outputs a first data strobe signal DQS_1 through the first I/O pad P1 and also outputs a first data strobe bar signal DQSB_1 through the fifth I/O pad P5. During a read operation in the third mode, the data strobe buffer 192 receives a second data strobe signal DQS_2 through the first I/O pad P1, receives a second data strobe bar signal DQSB_2 through the fifth I/O pad P5, compares the second data strobe signal DQS_2 with the second data strobe bar signal DQSB_2, and outputs a third data strobe signal DQS_3 according to the result of the comparison. The third mode may be an operating mode of the data strobe buffer 192 when the data strobe buffer 192 interfaces with DDR2 SDRAM or DDR3 SDRAM.

An operation of the data strobe buffer 192 in the third mode will hereinafter be described in detail with reference to FIGS. 7 through 8A. The data strobe buffer 192, unlike the data strobe buffer 190 or 191, includes more than one driver: a first driver 110 and a second driver 150.

During a write operation in the third mode, the first driver 110 outputs the first data strobe signal DQS_1, and the second driver 150 outputs the first data strobe bar signal DQSB_1. In this embodiment, like in the previous embodiments, the first driver 110 may output a first data strobe signal DQS_1 having a high level and a first data strobe signal DQS_1 having a low level in response to a first pull-up control signal PUC1 and a first pull-down control signal PDC1. The first driver 110 may also transition to a high impedance state Hi-Z in response to the first pull-up control signal PUC1 and the first pull-down control signal PDC1.

The second driver 150 may output a second data strobe bar signal DQSB_2, which is an inverted signal of the first data strobe signal DQSB_1, in response to a second pull-up signal PUC2 and a second pull-down signal PDC2. The second driver 150 may transition to the high impedance state Hi-Z in response to the second pull-up signal PUC2 and the second pull-down signal PDC2. During a write operation in the third mode, the receiver 140 may be disabled.

The receiver 140 includes a comparator 120 and a selector 130. A reference voltage Vref may be applied to a first input terminal T1 of the selector 130, and the second strobe bar signal DQSB_2 may be received at the second input terminal T2 of the selector 130. The second input terminal T2 is connected to the fifth I/O pad P5.

During a read operation in the third mode, the second data strobe bar signal DQSB_2 is received at the second input terminal T2 of the selector 130, and the selector 130 selects the second data strobe bar signal DQSB_2 and provides the second data strobe bar signal DQSB_2 to the comparator 120. Then, the comparator 120 compares the second data strobe bar signal DQSB_2 with the second data strobe signal DQS_2, and provides the third data strobe signal DQS_3 according to the result of the comparison.

During a read operation in the third mode, the first driver 110 and the second driver 150 may both serve as terminations. That is, if a first pull-up transistor PM1 and a first pull-down transistor NM1 are enabled in response to the first pull-up control signal PUC1 and the first pull-down control signal PDC1, respectively, the first pull-up transistor PM1 and the first pull-down transistor NM1 may have a first termination resistance value RT1 and a second termination resistance value RT2, respectively, as illustrated in FIG. 8B. Likewise, if a second pull-up transistor PM2 and a second pull-down transistor NM2 are enabled in response to the second pull-up control signal PUC2 and the second pull-down control signal PDC2, respectively, the second pull-up transistor PM2 and the second pull-down transistor NM2 may have a third termination resistance value RT3 and a fourth termination resistance value RT4, respectively, as illustrated in FIG. 8B. If the first driver 110 and the second driver 150 both serve as terminations, signal reflection can be minimized, and the preservation of signals can be improved when the second data strobe signal DQS_2 and the second data strobe bar signal DQSB_2 are input to the memory controller 101 from the memory device 201. In this case, since terminations are disposed in the memory controller 101, on-die terminations can be realized.

Figure 9:
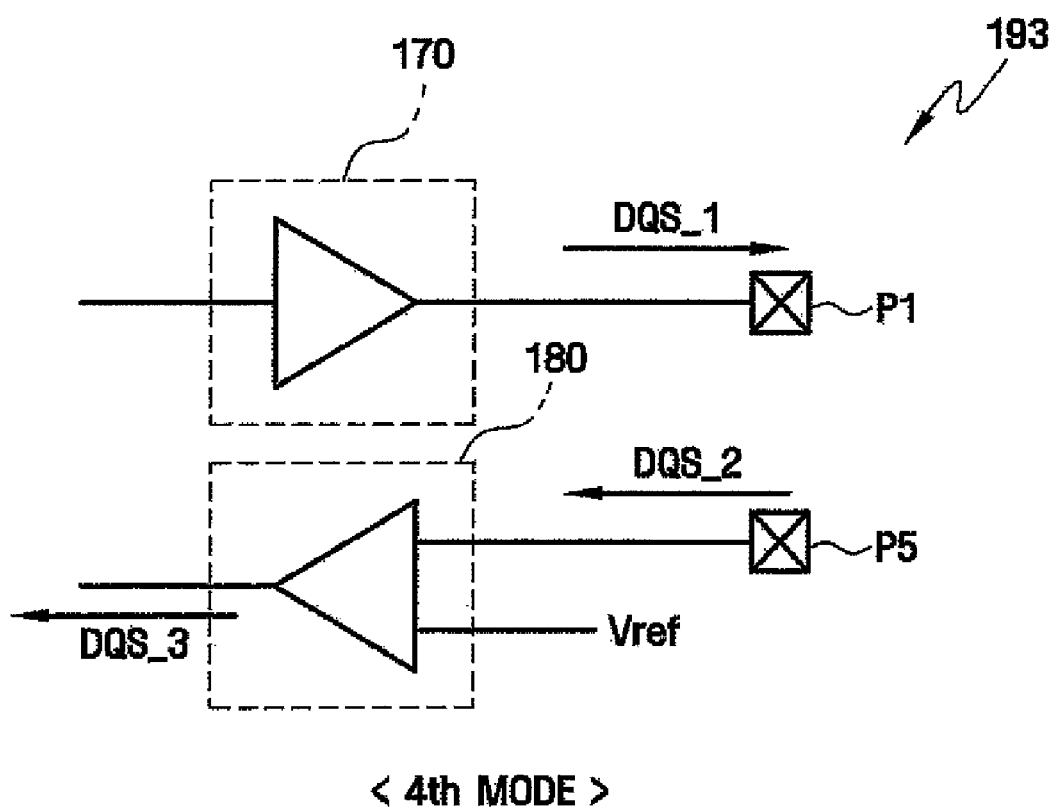
FIG. 9 is a circuit diagram of a data strobe buffer according to another embodiment of the present invention.
Figure 10A:
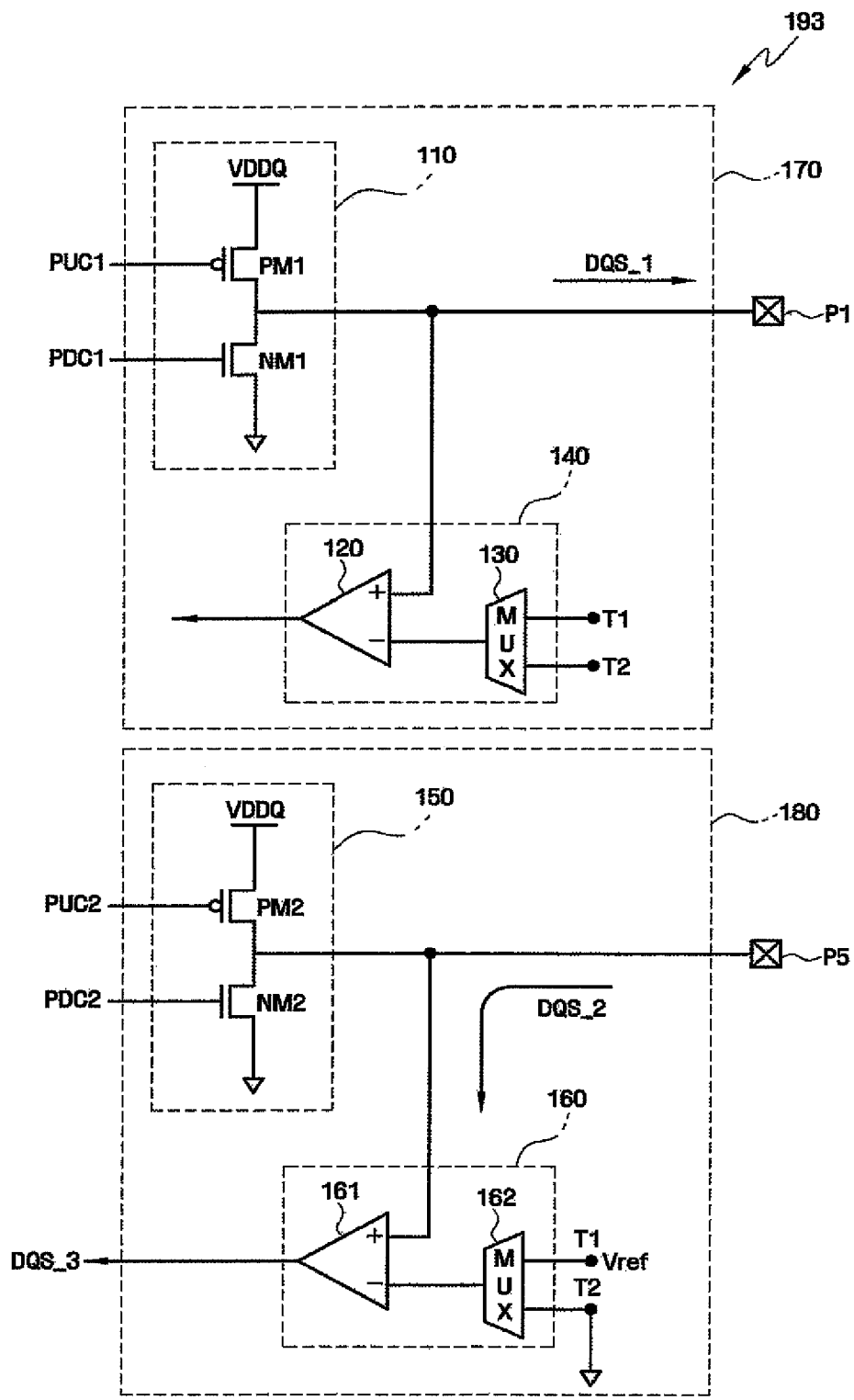
FIGS. 10A and 10B are equivalent circuit diagrams for explaining an operation of the data strobe buffer illustrated in FIG. 9.
Figure 10B:
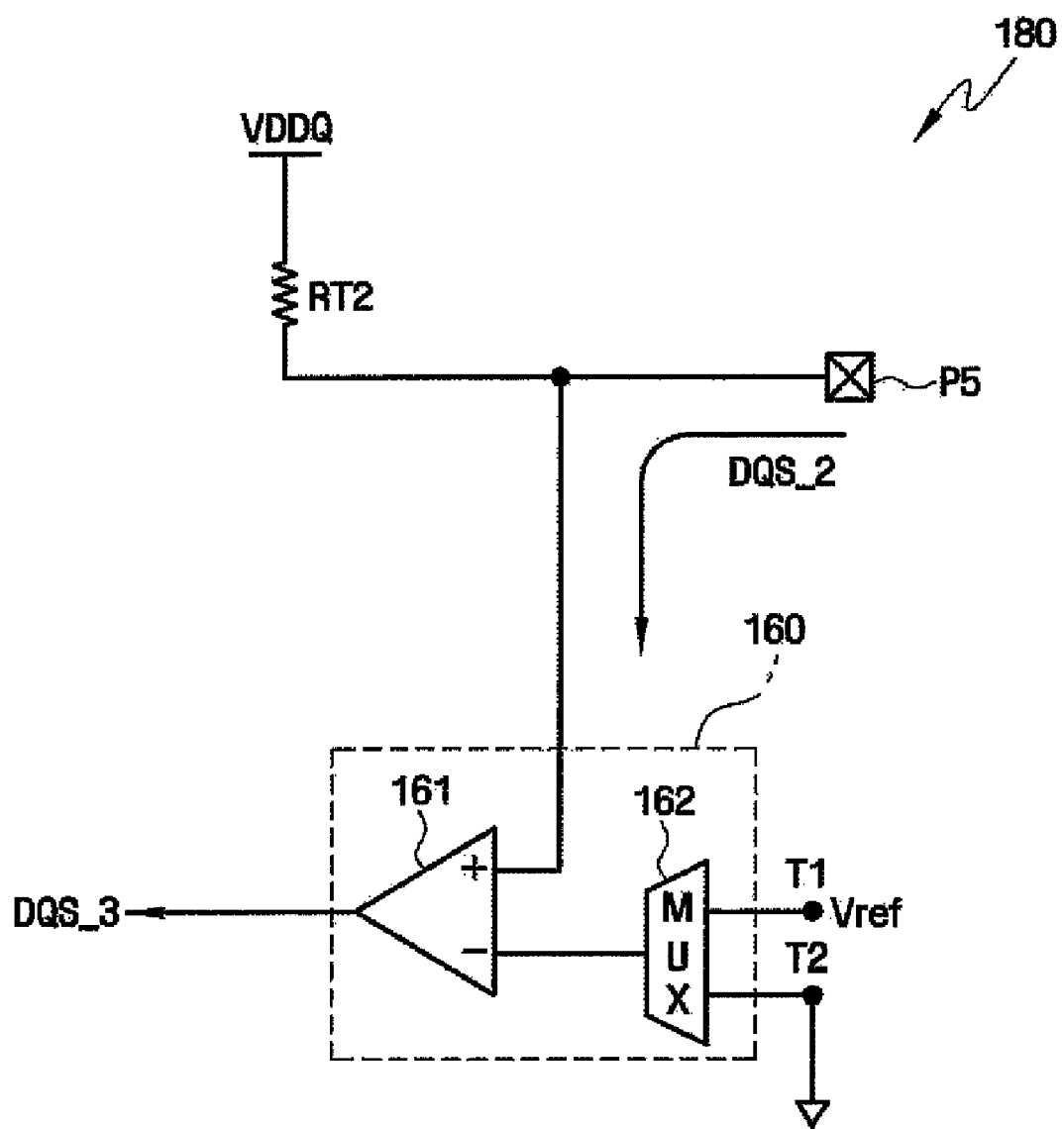

A data strobe buffer 193 according to another embodiment of the invention and a memory system including the data strobe buffer 193, according to another embodiment of the invention will hereinafter be described in detail with reference to FIGS. 9 through 10B. FIG. 9 is a circuit diagram of the data strobe buffer 193, and FIGS. 10A and 10B are equivalent circuit diagrams for explaining an operation of the data strobe buffer 193. In FIGS. 7A through 8B and 9 through 10B, like reference numerals represent like elements, and thus, detailed descriptions thereof will not be repeated.

The data strobe buffer 193 may operate in a fourth mode. In the fourth mode, the data strobe buffer 193 outputs the first data strobe signal DQS_1 through the first I/O pad P1, and receives a second data strobe signal DQS_2 through a fifth I/O pad P5. The fourth mode may be an operating mode of the data strobe buffer 193 when the data strobe buffer 193 interfaces with a graphic DDR (GDDR) SDRAM.

Referring to FIGS. 9 and 10A, the data strobe buffer 193 includes first and second drivers 110 and 150, and first and second receivers 140 and 160.

The combination of the first driver 110 and the first receiver 140 may be classified as a first function block 170. The first function block 170 outputs the first data strobe signal DQS_1 through the first I/O pad P1. During the output of the first data strobe signal DQS_1 by the first function block 170, the first receiver 140 may be disabled. The first receiver 140 may be optional.

The combination of the second driver 150 and the second receiver 160 may be classified as a second function block 180. The second function block 180 receives the second data strobe signal DQS_2 through the fifth I/O pad P5. With reference to FIG. 10B, the second pull-up transistor PM2 may be enabled in response to the second pull-up control signal PUC2, and may thus have a second termination resistance value RT2. In this case, the second pull-down transistor NM2 may be disabled in response to a second pull-down control signal PDC2.

As described above, the data strobe buffer according to the invention can interface with different types of semiconductor memory devices. While the invention has been particularly shown and described with reference to exemplary embodiments thereof, it will be understood by those of ordinary skill in the art that various changes in form and details may be made therein without departing from the spirit and scope of the present invention as defined by the following claims. For example, multiple features of one or more illustrated embodiments can be combined into a larger circuit, where control signals or jumpers are used to tailor the function of the larger circuit for the desired mode or modes of operation.

What is claimed is:

1. A data strobe buffer comprising:
    a first input/output node;
    a first driver coupled to the first input/output node, the first driver configured to output a first data strobe signal to the first input/output node during a write operation; and
    a first receiver coupled to receive a second data strobe signal from the first input/output node and output a third data strobe signal during a read operation when the data strobe buffer is in a first or second mode, the first receiver configured to compare the second data strobe signal with a first reference voltage and output a result of the comparison as the third data strobe signal when the data strobe buffer is in the first mode, the receiver further configured to not compare the second data strobe signal with the first reference voltage when the data strobe buffer is in the second mode.

2. The data strobe buffer of claim 1, wherein the first receiver is configured to output the second data strobe signal as the third data strobe signal when the data strobe buffer is in the second mode.

3. The data strobe buffer of claim 1, wherein the first driver includes:
    a pull-up transistor, a first side of the pull-up transistor coupled to a power supply voltage, a second side of the pull-up transistor coupled to the first input/output node, the pull-up transistor configured to couple the power supply voltage to the first input/output node in response to a pull-up control signal received on a gate of the pull-up transistor; and
    a pull-down transistor, a first side of the pull-down transistor coupled to a ground voltage, a second side of the pull-down transistor coupled to the first input/output node, the pull-down transistor configured to couple the ground voltage to the first input/output node in response to a pull-down control signal received on a gate of the pull-down transistor.

4. The data strobe buffer of claim 3, wherein the first driver serves as a termination during the read operation.

5. The data strobe buffer of claim 4, wherein the termination includes a first termination resistance value associated with the pull-up transistor and a second termination resistance value associated with the pull-down transistor, the pull-up transistor and the pull-down transistor being activated during the read operation.

6. The data strobe buffer of claim 4, wherein, the termination includes a first termination resistance value associated with the pull-up transistor, the pull-up transistor being activated during the read operation, the pull-down transistor being deactivated during the read operation.

7. The data strobe buffer of claim 1, wherein the first receiver includes a comparator, a first input of the comparator coupled to the first input/output node, the third data strobe signal being output from the comparator.

8. The data strobe buffer of claim 7, wherein the first receiver further includes a first selector, an output of the first selector coupled to a second input of the comparator.

9. The data strobe buffer of claim 8, wherein the first selector is an analog multiplexer.

10. The data strobe buffer of claim 8, wherein a reference voltage is coupled to a first input of the first selector, a ground voltage is coupled to a second input of the first selector, the first selector being configured to output the reference voltage to the second input of the comparator during the read when the data strobe buffer is in the first mode, the first selector being further configured to output the ground voltage to the second input of the comparator during the read operation when the data strobe buffer is in the second mode.

11. The data strobe buffer of claim 8, wherein the first receiver further includes a second selector, the first input/output node being coupled to an input of the second selector, an output of the second selector being coupled to the first input of the comparator.

12. The data strobe buffer of claim 8, further comprising:
a second input/output node; and
a second driver coupled to the second input/output node, the second driver configured to output a first data strobe bar signal to the second input/output node during the write operation, the first data strobe bar signal being an inversion of the first data strobe signal, and the second input/output node coupled to an input of the first selector.

13. The data strobe buffer of claim 12, the first input/output node configured to receive the second data strobe signal during the read operation, the second input/output node configured to receive a second data strobe bar signal during the read operation, and the first selector being configured to output the second data strobe bar signal to the second input of the comparator during the read operation when the data strobe buffer is in the second mode.

14. The data strobe buffer of claim 12, wherein the first driver includes:
a first pull-up transistor, a first side of the first pull-up transistor coupled to a power supply voltage, a second side of the first pull-up transistor coupled to the first input/output node, the first pull-up transistor configured to couple the power supply voltage to the first input/output node in response to a first pull-up control signal received on a gate of the first pull-up transistor; and
a first pull-down transistor, a first side of the first pull-down transistor coupled to a ground voltage, a second side of the first pull-down transistor coupled to the first input/output node, the first pull-down transistor configured to couple the ground voltage to the first input/output node in response to a first pull-down control signal received on a gate of the first pull-down transistor.

15. The data strobe buffer of claim 14, wherein the second driver includes:
a second pull-up transistor, a first side of the second pull-up transistor coupled to the power supply voltage, a second side of the second pull-up transistor coupled to the second input/output node, the second pull-up transistor configured to couple the power supply voltage to the second input/output node in response to a second pull-up control signal received on a gate of the second pull-up transistor; and
a second pull-down transistor, a first side of the pull-down transistor coupled to the ground voltage, a second side of the second pull-down transistor coupled to the second input/output node, the second pull-down transistor configured to couple the ground voltage to the second input/output node in response to a second pull-down control signal received on a gate of the second pull-down transistor.

16. The data strobe buffer of claim 12, wherein the first driver serves as a first termination during the read operation and the second driver serves as a second termination during the read operation in the second mode.

17. A data strobe buffer comprising:
a first input/output node;
a second input/output node;
a driver coupled to the first input/output node, configured to output a first data strobe signal to the first input/output node during a write operation; and
a receiver coupled to receive a second data strobe signal from the second input/output node and output a third data strobe signal during a read operation when the data strobe buffer is in a first or second mode, the first receiver configured to compare the second data strobe signal with a first reference voltage and output a result of the comparison as the third data strobe signal when the data strobe buffer is in the first mode, the receiver further configured to not compare the second data strobe signal with the first reference voltage when the data strobe buffer is in the second mode.

18. The data strobe buffer of claim 17, the receiver is configured to output the second data strobe signal as the third data strobe signal when the data strobe buffer is in the second mode.

19. The data strobe buffer of claim 17, the receiver further includes a selector and comparator, an output of the selector coupled to an input of the comparator.

20. The data strobe buffer of claim 17, the first driver includes;
a pull-up transistor, a first side of the pull-up transistor coupled to a power supply voltage, a second side of the pull-up transistor coupled to the first input/output node, the pull-up transistor configured to couple the power supply voltage to the first input/output node in response to a pull-up control signal received on a gate of the pull-up transistor; and
a pull-down transistor, a first side of the pull-down transistor coupled to a ground voltage, a second side of the pull-down transistor coupled to the first input/output node, the pull-down transistor configured to couple the ground voltage to the first input/output node in response to a pull-down control signal received on a gate of the pull-down transistor,
wherein the driver serves as a termination during the read operation.

* * * * *